Sept. 13, 1955  C. B. McCATHRON  2,717,543
COMBINED RANGE AND VIEW FINDER FOR CAMERAS
Filed April 4, 1950  7 Sheets-Sheet 1

INVENTOR.
CLAUDE B. McCATHRON
BY
ATTORNEY

Sept. 13, 1955 C. B. McCATHRON 2,717,543
COMBINED RANGE AND VIEW FINDER FOR CAMERAS
Filed April 4, 1950 7 Sheets-Sheet 2

INVENTOR.
CLAUDE B. McCATHRON
BY
ATTORNEY

Sept. 13, 1955  C. B. McCATHRON  2,717,543
COMBINED RANGE AND VIEW FINDER FOR CAMERAS
Filed April 4, 1950  7 Sheets-Sheet 3

INVENTOR.
CLAUDE B. McCATHRON
BY
[signature]
ATTORNEY

Sept. 13, 1955 C. B. McCATHRON 2,717,543
COMBINED RANGE AND VIEW FINDER FOR CAMERAS
Filed April 4, 1950 7 Sheets-Sheet 4
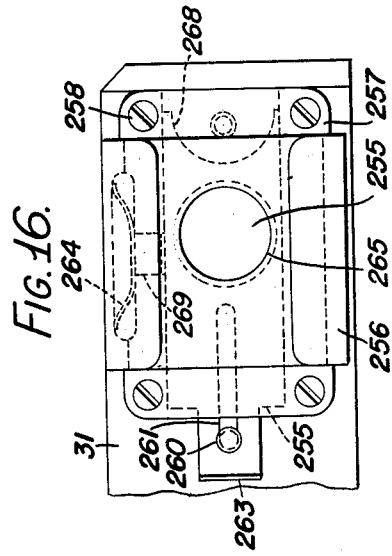
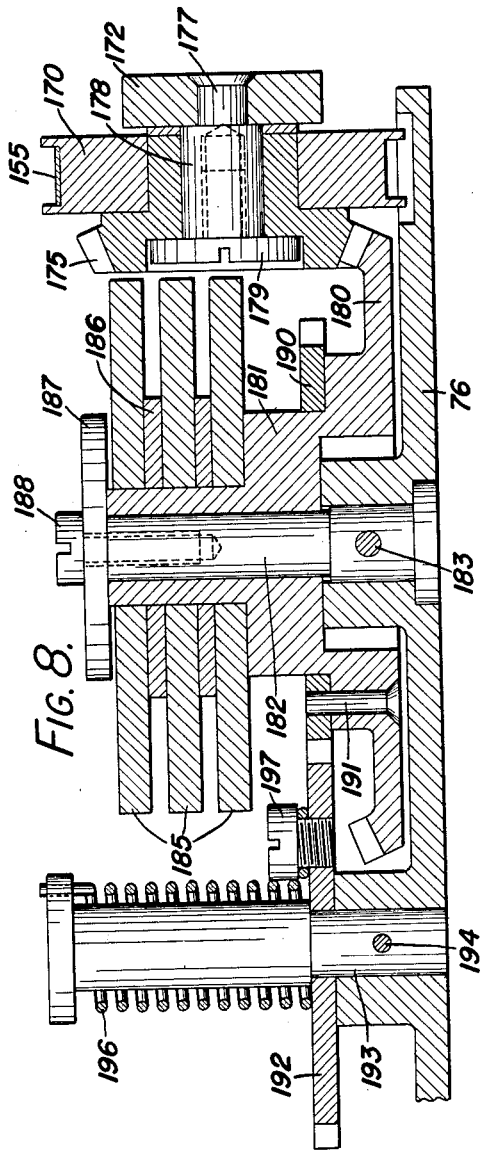
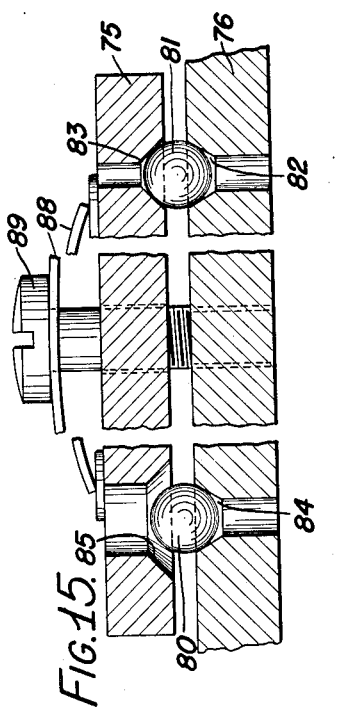
INVENTOR.
CLAUDE B. McCATHRON
BY
ATTORNEY

INVENTOR.
CLAUDE B. MC CATHRON
BY
ATTORNEY

INVENTOR.
CLAUDE B. MCCATHRON
BY
ATTORNEY

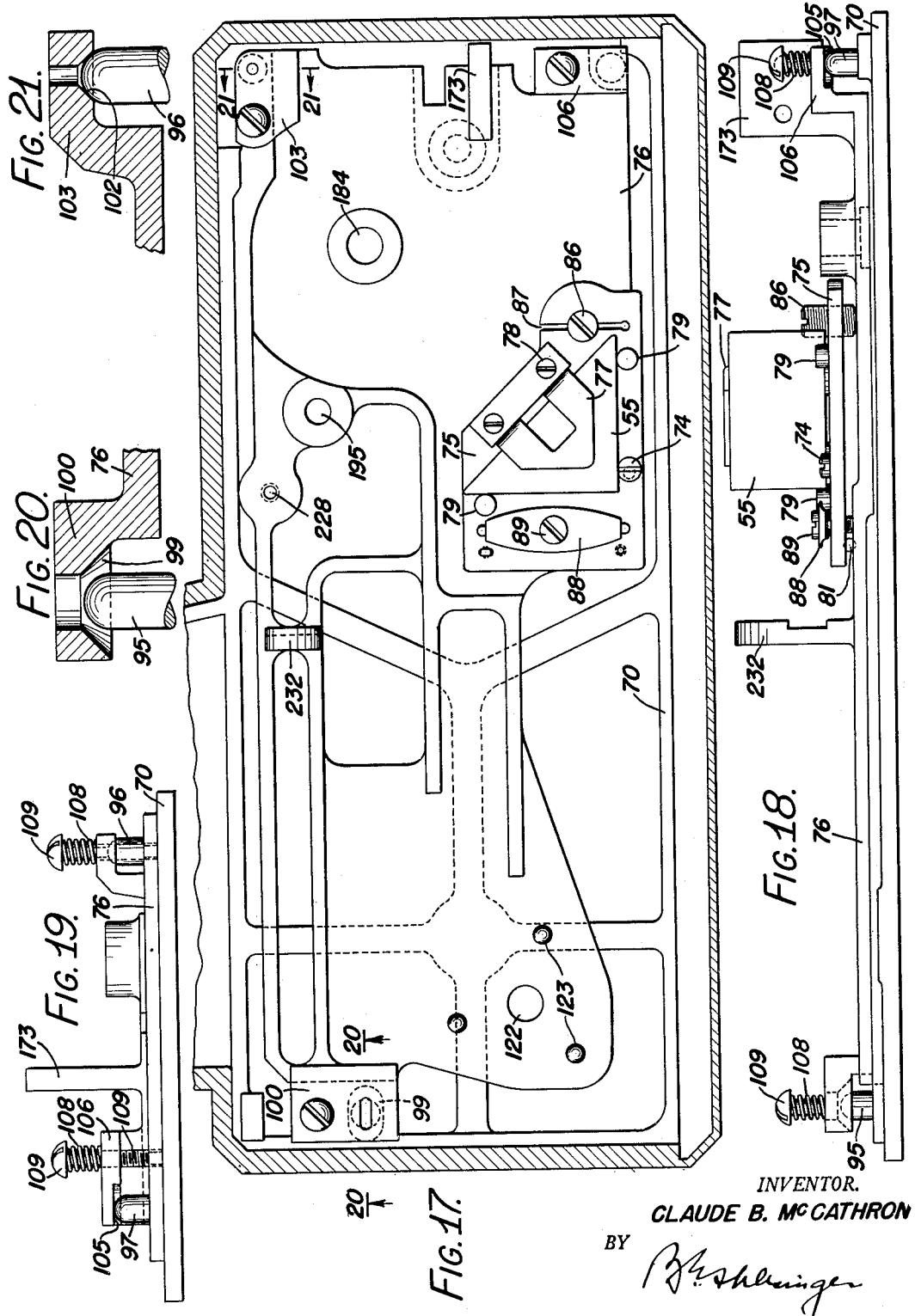

United States Patent Office 2,717,543
Patented Sept. 13, 1955

2,717,543

COMBINED RANGE AND VIEW FINDER FOR CAMERAS

Claude B. McCathron, Rochester, N. Y., assignor to Graflex, Inc., Rochester, N. Y., a corporation of Delaware Application April 4, 1950, Serial No. 153,884

5 Claims. (Cl. 95—44)

The present invention relates to a combination range finder, view finder and focus finder for use on photographic cameras.

Different proposals have been made in the past for a combination range finder and view finder but in those, with which I am familiar, a semi-transparent mirror has been mounted upon the axis of the view finder for employment as part of the range finder. This construction is not entirely satisfactory for the reason that for view finding there should be sharp definitions of the object which is to be photographed. Accordingly, it as been the more general practice to make the range finder separate from the view finder and to mount the range finder at one side of the camera where it will not interfere with the view finder. This arrangement has, however, the objection that the photographer must shift his eye back and forth from the range finder to the view finder while focusing the camera. In so shifting, the photographer is liable to shift the camera slightly with the result that the photograph will not give precisely the image desired, or that it will not be sharply defined due to slight change in focal distance.

The present invention relates in particular to a combined range finder and view finder in which the range finder is connected to and actuated by the focusing mechanism of the camera, so that focusing can be controlled directly through the range finder. In such a combination range finder and view finder correction must be made for parallax if precise focusing is to be obtained. It is sometimes desirable in precision cameras to use lenses of different focal lengths when photographing different subjects. For lenses of different focal lengths, however, different parallax corrections are required at the view finder. This has heretofore been difficult to effect precisely.

Moreover, it has heretofore been the practice to mount range and view finders directly on the camera body. Expansion and contraction of the camera body has heretofore, therefore, directly affected the range finder, introducing errors which can affect the definition of the photograph. In precision photography such errors can be serious.

A primary object of the present invention is to provide a combination range finder and view finder in which the range finder and the view finder comprise separate optical systems but in which the eye pieces for the range finder and view finder are juxtaposed so that the subject can be viewed and the camera focused without appreciable shift of the eye.

Another object of the invention is to provide a coupled type of range finder in which simple, improved means is provided for coupling the range finder to the objective lens of the camera so that proper focusing can readily be achieved under control of the range finder.

Another object of the invention is to provide a combination range finder and view finder having a simple, inexpensive means for automatically correcting for parallax while focusing.

A further object of the invention is to provide a combination range finder and view finder having a parallax-correcting mechanism which can readily be adjusted to compensate for differences in the focal lengths of the different lenses which may be employed in a camera.

A still further object of the invention is to provide an improved mounting for a combination range finder and view finder which floats relative to the camera body and which will prevent changes in temperature of the camera body from affecting the operation of the range and view finders.

Another object of the invention is to provide a combination range finder and view finder which may be employed regardless of the light conditions prevailing at the time and place of taking the photograph, and which includes a light beam focusing device that may be, if desired, permanently fixed to the range finder and be always available for use.

Still another object of the invention is to provide in a single compact unit, a range finder, a view finder, and a light-beam focusing device, which will be easy to manufacture and assemble, which will be precise in operation, which can readily be mounted upon a camera, and which will be relatively inexpensive.

Other objects of the invention will be apparent hereinafter from the specification and from the recital of the appended claims.

In the drawings:

Fig. 6 is a fragmentary sectional view on the line 6—6 of Fig. 5 showing parts of the mechanism for correcting for parallax;

Fig. 7 is a view at right angles to Fig. 6 showing the parallax frame and details of the mounting of the parallax arm;

Fig. 8 is a fragmentary section on an enlarged scale showing details of the drive to the parallax correcting mechanism and of the wind-up mechanism therefor;

Fig. 15 is a fragmentary section on the line 15—15 of Fig. 5 on a greatly enlarged scale, and showing details of the mounting of one prism;

Fig. 16 is a fragmentary view showing details of the mounting of the focus light chamber and showing the slide which may be used to shut off that chamber from the main housing of my apparatus;

Fig. 17 is a fragmentary plan view showing the base of the range finder housing and the floating base on which parts of the range finder mechanism are mounted;

Fig. 18 is a front elevation of the parts shown in Fig. 17;

Fig. 19 is a side view looking from the right of Fig. 17;

Fig. 20 is a fragmentary section on the line 20—20 of Fig. 17 looking in the direction of the arrows; and Fig. 21 is a fragmentary section on the line 21—21 of Fig. 17, looking in the direction of the arrows.

Figure 1:
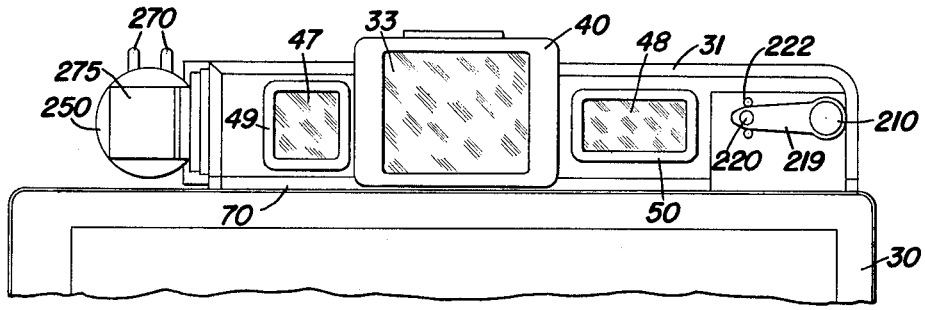
Fig. 1 is a fragmentary front elevation showing a combination range finder, view finder, and focus finder constructed according to one embodiment of this invention, mounted upon the top of a conventional type camera.

Referring now to the drawings by numerals of reference, 30 denotes the camera box or casing, while 31 denotes the housing or cover of the combined range finder and view finder of the present invention. The cover or housing 31 is removably secured to a base 70 (Figs. 17, 18 and 19) by screws 34 (Fig. 5) which thread into lugs 36 that are formed integral with the base. The base 70 is secured to the top of the camera box 30 by screws (not shown) or in any other suitable manner.

Figure 2:
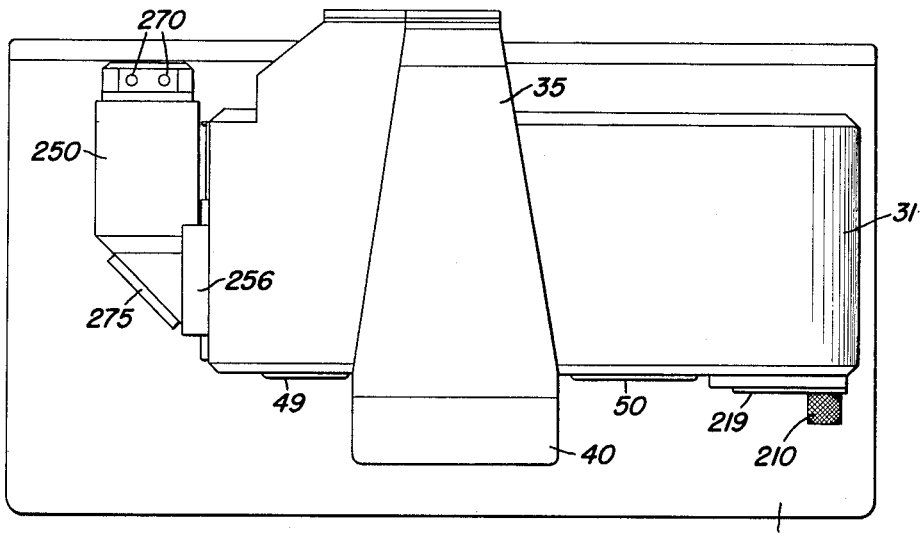
Fig. 2 is a plan view of the parts shown in Fig. 1.

The cover or housing 31 is formed with a forwardly projecting rectangular shaped portion 32 (Fig. 5) within which there is mounted the objective 33 of the view finder, which in the instance shown comprises a plano-concave lens 33' and a plano-concave lens 33''. The casing 31 is formed also with a rearwardly projecting portion 35. This rearwardly projecting portion 35 is formed with a sighting opening 37 which is axially aligned with the objective 33 and within which is mounted a lens 38. A cover plate 40 (Figs. 1, 2 and 5) is secured to the front projecting portion 32 of the housing to protect the objective 33. This cover plate has a rectangular opening 41 through which the subject may be framed and viewed. The lenses 33 and 38 constitute the view finder whose optical axis is denoted at 39.

Mounted within apertures 45 and 46 in the cover or casing 31 at opposite sides of the objective 33 are flat pieces 47 and 48 of clear glass. These are secured within apertured caps 49 and 50 (Figs. 1 and 5) which are shaped as in Fig. 1.

Figure 3:
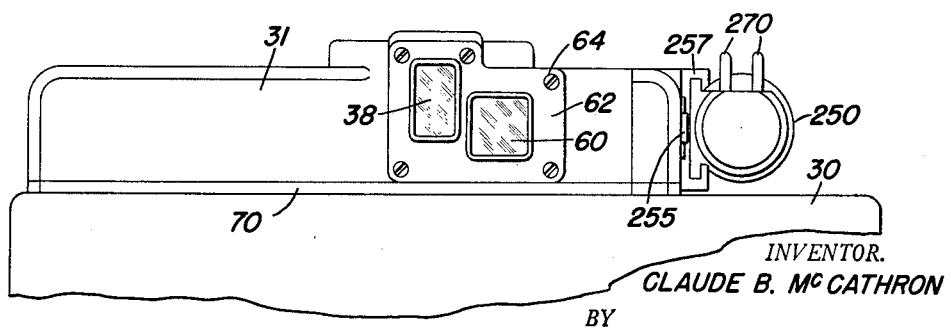
Fig. 3 is a rear elevation of the parts shown in Fig. 1.

Mounted behind the glass 48 is a right angle prism 55. Mounted behind the glass 47 is a semi-transparent mirror 57. Mounted behind the semi-transparent mirror 57 is a rhomboid prism 58. The rearwardly projecting portion 35 of the housing is formed with a sight opening 59 which is parallel and adjacent to the sight opening 37, and within this opening and behind the prism 58 is mounted a flat piece 60 of clear glass. The lens 38 and glass 60 are held in place by a retainer plate 62 and a gasket 63. The retainer plate is secured to the housing by screws 64 (Fig. 3). The retainer plate and the gasket are provided behind lens 38 and glass 60 with eye openings 65 and 66 to which the photographer may apply his eye selectively to view the subject or to focus the camera.

Mounted upon the base 70 of the housing 31 in a manner, which will be described more particularly hereinafter, is a floating base 76. This floating base has a generally rectangular shape in plan view, and does not extend into the front or rear projections 32 and 35 of the housing.

Figure 5:
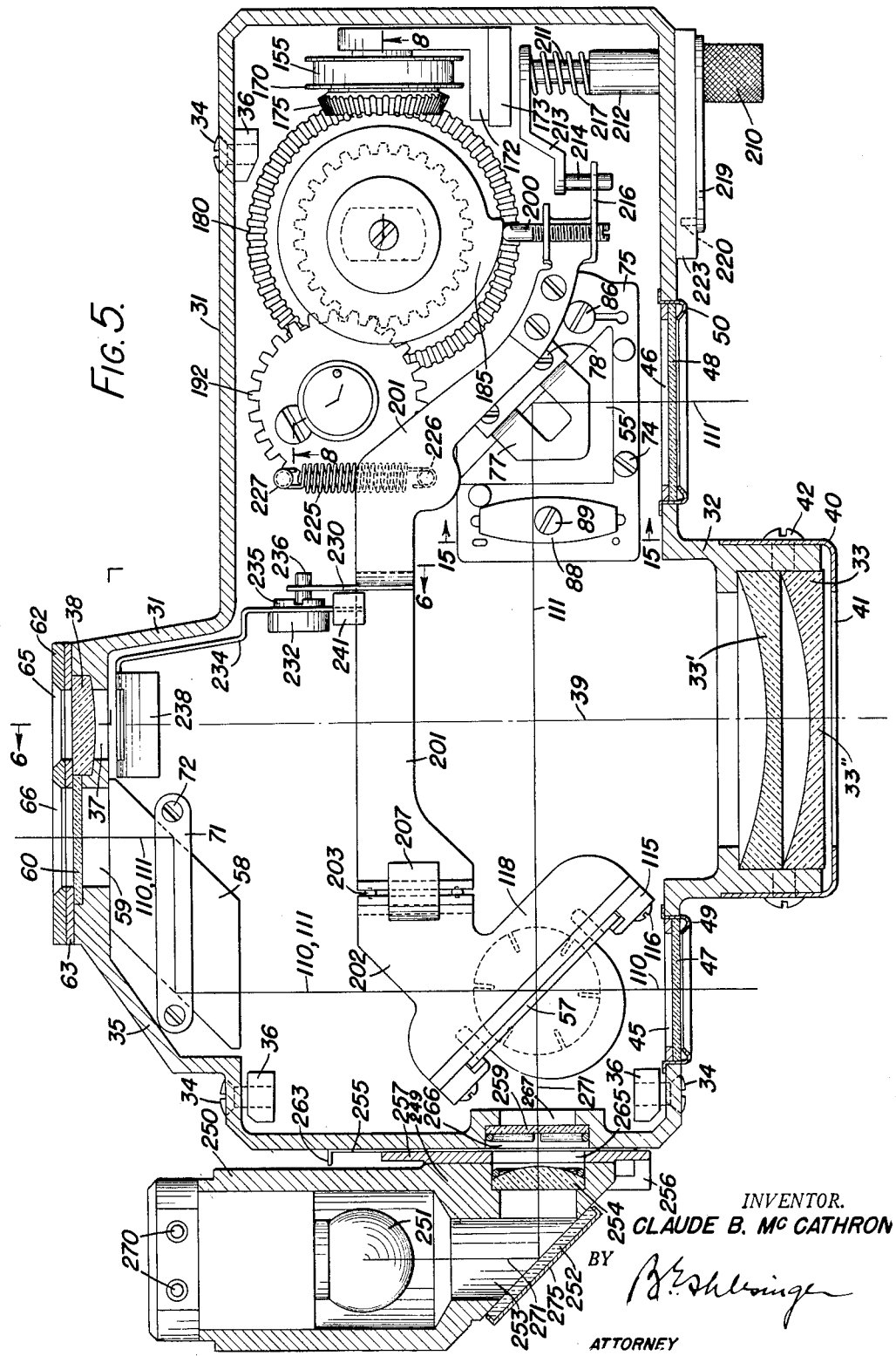
Fig. 5 is a horizontal sectional view of a greatly enlarged scale through the combination range finder and view finder and focus finder.
Figure 9:
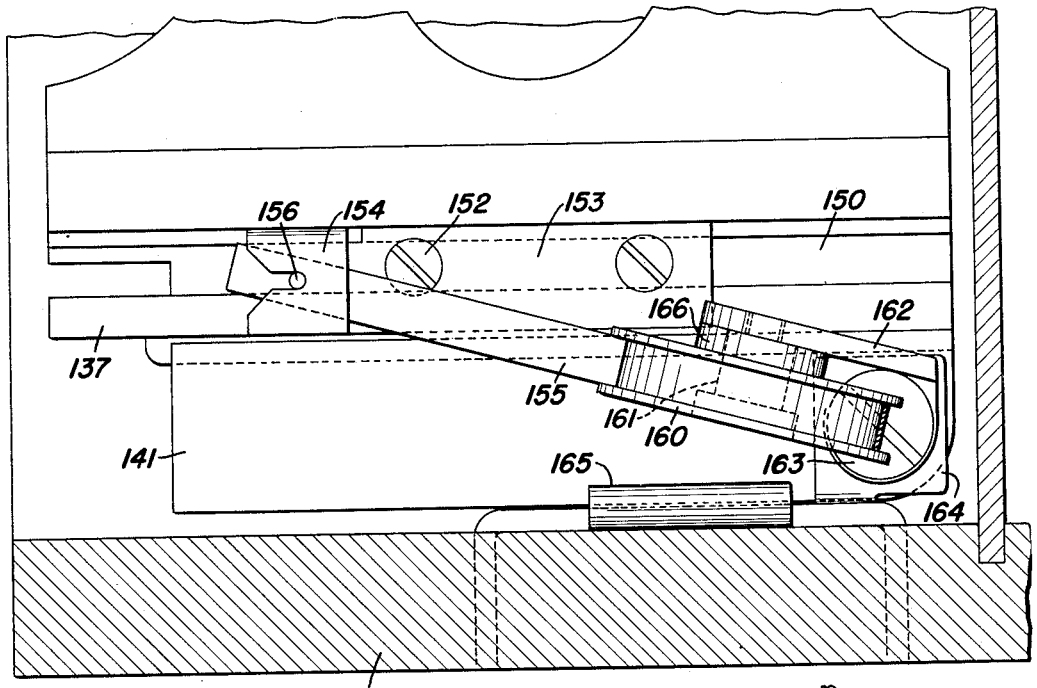
Fig. 9 is a fragmentary plan view on an enlarged scale showing the connection between the tape, which actuates the parallax correcting mechanism, and the objective slide of the camera.
Figure 10:
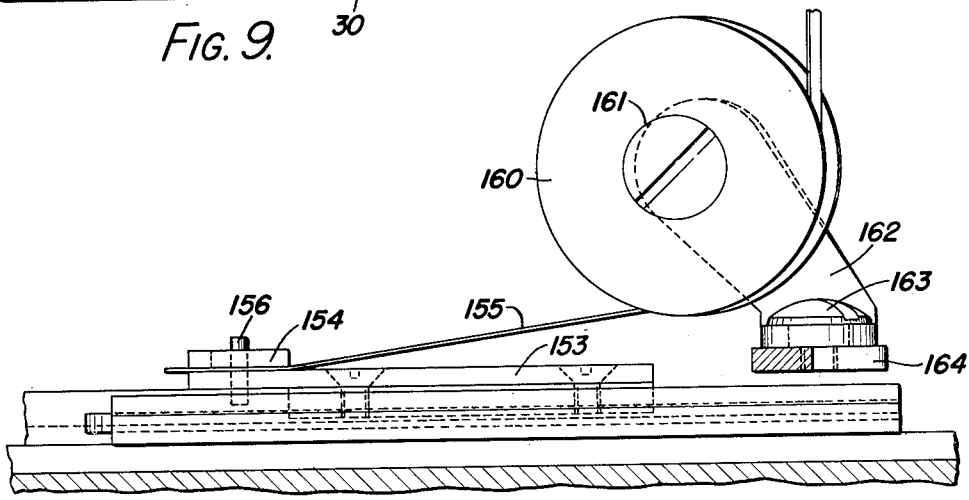
Fig. 10 is a side elevation of certain of these parts.
Figure 11:
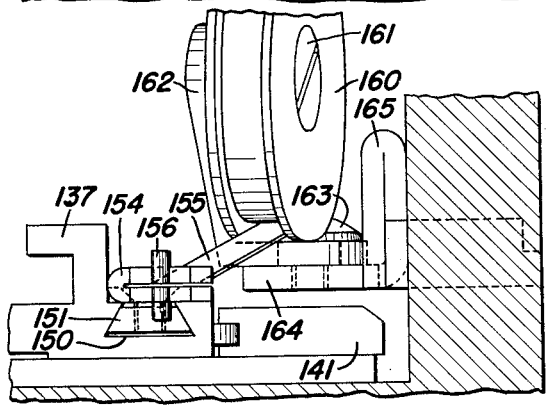
Fig. 11 is a front elevation of these parts.

The prism 58 is secured directly to the base 70 (Figs. 17 and 18) of the housing 31 by a strap 71 and screws 72 (Fig. 5).

The prism 55 is mounted upon a plate 75 (Figs. 5, 17 and 18). This plate, in turn, is mounted upon the floating base 76. The prism 55 is held down on the plate 75 by a strap 77 which engages over the top of the prism and is fastened to the floating base 76 by screws 78. The prism is centered on the plate 75 by pins 79. It is clamped against the strap 77 by the screw 74 whose head is eccentric of its shank as shown in Fig. 17.

The plate 75 is adjustably mounted upon the floating base 76, there being two balls 80 and 81 (Fig. 15) interposed between the floating base 76 and the plate 75 and on which the plate 75 is mounted. One of these balls engages in opposed conical sockets 82 and 83 formed, respectively, in the plate 75 and floating base 76. The other ball 80 engages in a conical socket 84 formed in the floating base 76 and in an elongated socket 85 formed in the plate 75. A set-screw 86 (Figs. 17 and 18), which is secured within a slot 87 in the plate 75, engages the top of the floating base 76, and may be adjusted to tilt the plate 75 angularly about the balls 80 and 81 to adjust the prism 55 about a horizontal axis. The elongated socket 85 permits some adjustment of the plate 75 about the ball 81 as a vertical axis. Thus, in assembling the range finder in the factory, the prism 55 can readily be adjusted to the proper position in the optical system of the combined range finder and view finder. A strap spring 88, that is secured to the floating base 76 by a screw 89 and that engages the top of the plate 75, serves to hold the plate down on the balls 80 and 81. It locks the prism 55 in position after the adjustment is made.

The floating base 76 has a three-point mounting on the base portion 70 of the housing 31. This mounting is by means of the pins 95, 96 and 97 (Figs. 17, 18, 19, 20 and 21). Each of these pins is rigidly secured in the base portion 70 of the housing. Each has a rounded top. The rounded top portion of the pin 95 engages in an elongated recess 99 formed in a ledge 100 that projects upwardly and at one side from the floating base 76. The pin 96 engages in a conical recess 102 formed in a ledge 103 that projects upwardly and rearwardly from the floating base 76. The upper end of the pin 97 engages a plane-bottomed recess 105 formed on a ledge 106 which projects upwardly and laterally from the floating base 76. The floating base is held down on the base portion 70 by three coil springs 108 which surround the screws 109 and which thread into the base portion 70 of the housing. The tension of the springs 108 can be adjusted by adjustment of the screws 109.

The plane surfaced seat 105 in ledge 106 and the elongated recess 99 are sufficiently larger than the heads of the pins 97 and 95, respectively, to permit expansion of the base portion 70 of the housing laterally in two directions without said expansion affecting the floating base 76. Thus, lateral expansion or contraction of the camera box 30 is not transmitted to the range and view finder mechanism.

The semi-transparent mirror 57 is adapted to transmit light from the glass 47 directly to the prism 58 which in turn reflects this light through the glass 60 to the eye of the photographer. 110 denotes the line of travel of a light beam through this optical system. The semi-transparent mirror 57 is also intended to transmit light, which passes through the glass 48 and is reflected by the prism 55, to prism 58, which transmits the light through glass 60 to the eye. 111 denotes a light beam passing through this portion of the optical system.

Figure 12:
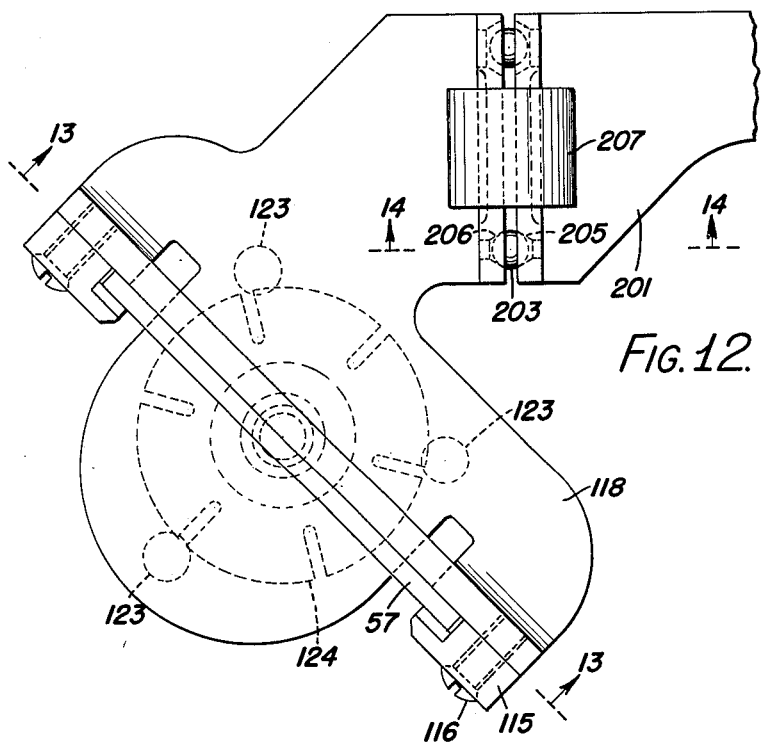
Fig. 12 is a fragmentary plan view showing details of the mounting of the semi-transparent mirror.

The semi-transparent mirror 57 is clamped by means of gibs 115 and screws 116 (Figs. 5 and 12) to a bracket 118 which is pivotally mounted upon the floating base 76 for movement about a vertical axis. For the purpose of this pivotal movement a cylindrical bearing member 120 is secured in the bracket 118 by a threaded portion 121. This bearing member seats in a cylindrical bearing hole 122 (Fig. 17) in the floating base 76. The bracket 118 is mounted upon three balls 123 that are equi-angularly spaced about the bearing hole 122 and that are held against the bottom of the bracket 118 by a leaf spring 124. This spring is held in position and its tension is adjusted by a nut 125 which threads onto the lower stem portion of the bearing member 120.

In using the range finder to focus the camera, the mirror 57 is moved angularly about the vertical axis of the bearing 120 until the two images of the subject, which are seen through the two glasses 47 and 48, are superimposed exactly upon one another. Movement of the mirror is effected automatically by focusing adjustment of the bed plate of the camera.

The camera is provided with the usual camera bed 130 (Fig. 4) which is held in operative position by the side arms 131 and which is hinged to the camera box 30. The camera objective 133 is mounted in conventional manner by means of brackets 135 on a slide 136 which is clamped in conventional manner to tracks 137 and 138 (Figs. 4, 9, 10 and 11). The tracks 137 and 138 are mounted to slide in the camera box 30 and on the bed 130, respectively. Aligned tracks 138 and 137 are connected together by links or other conventional connecting means (not shown). Thus, any movement imparted to the tracks 138 is transmitted to the tracks 137 causing them to travel in the guideways 141 of the camera box. The rails 138 are adjusted as usual by a focusing knob 140. This knob carries pinions (not shown) which engage racks 142 formed on the underside of the tracks 138. The camera objective 133 is connected at one end to the bellows 144 of the camera in conventional manner.

Only one track 137 and one track 138 are shown in the drawings of the present application but in conventional manner there are two parallel tracks 137 connected by links to two parallel tracks 138. One track 137 shown has a dove-tailed groove 150 formed in it. Mounted in this groove is a correspondingly shaped block 151. Secured to this block by means of screws 152 is a plate 153 which has a front portion 154 bent parallel upon itself. Secured to the plate 153 between the parallel portions thereof by means of a pin 156 is one end of a flat tape 155. The screws 152 are adapted to be adjusted to clamp the block 151 rigidly in the groove 150 so that when the tracks 138 and 137 are adjusted by means of the focusing knob 140, the tape 155 will move with the tracks.

The tape 155 rides under an idler pulley 160 which is mounted by means of a pivot stud 161 in a right angled bracket 162 that in turn is mounted by means of a pivot stud 163 on an arm 164 which projects from a plate 165 that is fastened in the side wall of the camera housing 30. A spacing washer 166 (Fig. 9) is interposed between the pulley 160 and the arm 162.

Figure 4:
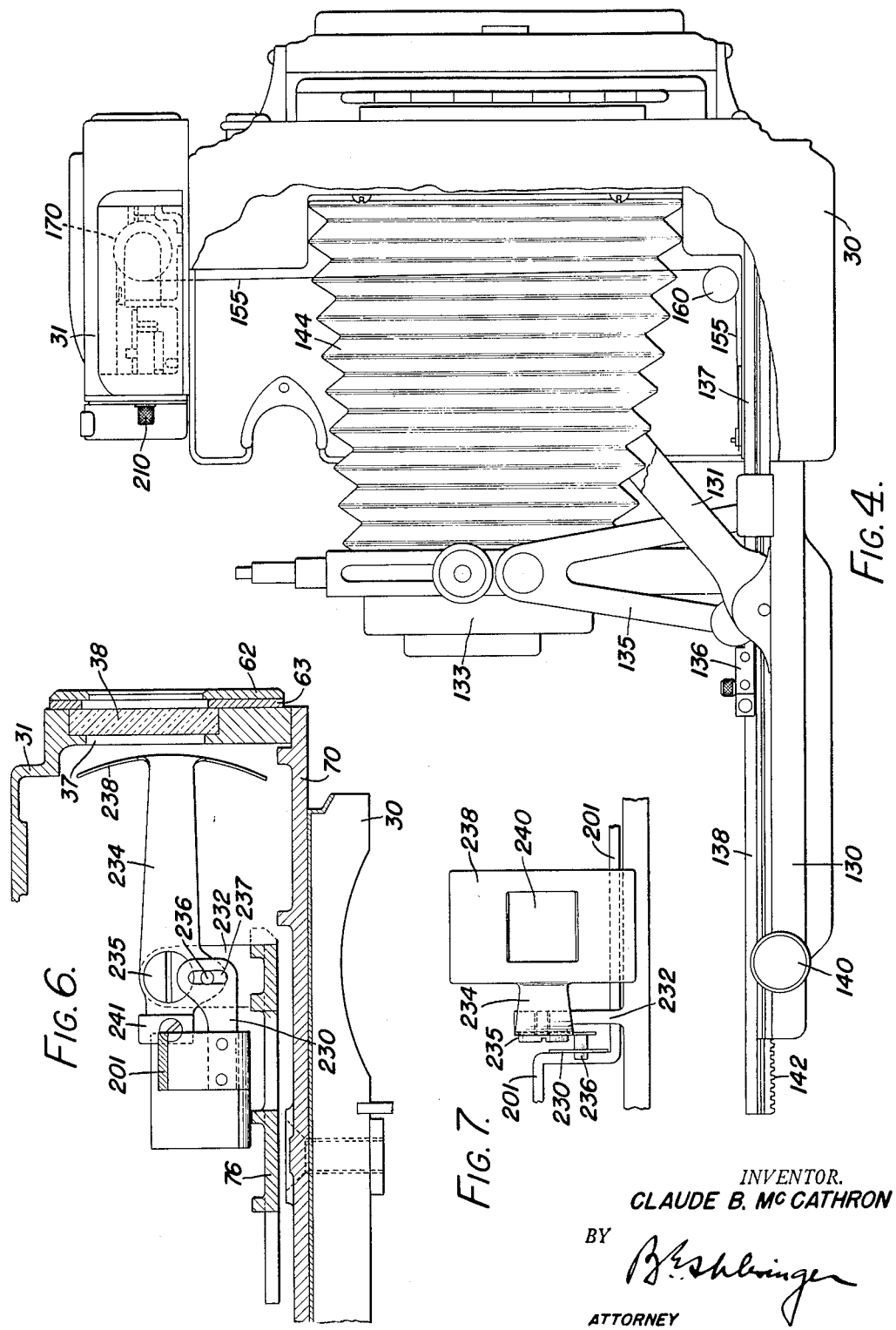
Fig. 4 is a side elevation of the camera showing the combination range finder, view finder and focus finder mounted thereon and showing the means which connects the focusing mechanism of the camera with the range finder to effect parallax correction in the view finder simultaneously with focusing.

The upper end of the tape 155 is fastened to a drum 170 (Figs. 4, 5 and 8). The drum 170 is mounted upon the hub of a bevel pinion 175 and is keyed or otherwise secured to the pinion so that the two rotate together. The pinion is rotatably mounted upon a stud 177 that is fastened in a bracket 172 and that is formed with an enlarged cylindrical portion 178 forming a bearing for the pinion. The bracket 172 is fastened to a lug 173 (Figs. 5 and 17) that is integral with and projects upwardly from the floating base 76. The pinion is held on the bearing portion 178 by a clamping screw 179.

The bevel pinion meshes with a bevel gear 180 (Figs. 5 and 8). This gear has a hub portion 181 which is rotatably mounted upon a stud 182 that is rigidly secured by means of a pin 183 in a hole 184 (Fig. 17) in the floating base 76. Fastened to the hub 181 of the gear 180 (Fig. 8) are several cams 185 that are separated from one another by spacers 186. A clamping disc 187 and a screw 188, which threads into the stud 182, serve to hold the cams on the hub of the gear 180.

There is a spur gear 190 pinned to the bevel gear 180 by pin 191. This spur gear meshes with another spur gear 192 that is rotatably mounted on a stud 193 which is secured by means of a pin 194 in a hole 195 (Fig. 17) in the floating base. A coil spring 196 (Fig. 8), which is secured at one end to the stud 193 and which is fastened at its opposite end by means of a screw 197 to the spur gear 192, is wound up on rotation of the spur gear 192 to maintain tension on the tape 155 as the objective lens of the camera is moved back and forth on the tracks 137 and 138 in focusing the camera.

The cams 185 are provided to correct for parallax. Because a different parallax correction is required for each objective lens with which the camera is supplied, different cams 185 are required for the different objective lenses. A typical shape of cam is shown in plan in Fig. 5. The cams 185 will differ from one another in shape in accordance with the differences in focal lengths of the different objective lenses.

Figure 14:
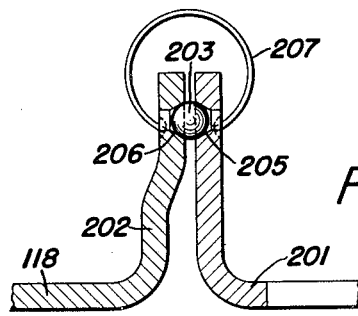
Fig. 14 is a section on the line 14—14 of Fig. 12, looking in the direction of the arrows.

Each cam 185 serves not only for parallax correction of the view finder, as will be described more particularly hereinafter, but is also adapted on rotation to rock the mirror 57 about its pivotal axis. A follower pin 200 (Fig. 5) is adapted to be engaged selectively with that of one of the cams 185, which corresponds to the objective lens being used at a given time in the camera. This follower pin is adjustably threaded into an arm 201 that is hingedly connected to an arm 202 which projects from the bracket 118. The hinge connection is by means of two spaced balls 203 (Figs. 12 and 14) and a spring clip 207. The balls are mounted in conical sockets 205 and 206 provided in parallel portions of arms 201 and 202, respectively. The spring clip 207 engages the back sides of both arms.

A coil spring 225, which is secured at one end by means of a pin 226 in the arm 201 and at its opposite end by means of a pin 227, serves to hold the follower 200 in engagement with the periphery of whichever cam 185 it is engaged. The pin 227 is threaded into a hole 228 (Fig. 17) in the floating base.

When the objective lens of the camera is changed, the follower 200 is shifted from the cam 185, with which it has previously been engaged, to the cam 185 corresponding to the new objective. This is effected by pulling out and rotating a knob 210 (Fig. 5). This knob is secured to a shaft 211 that is journaled in a protrusion 212 of the cover or housing 31. It carries at its inner end an arm 213, to which there is secured a pin 214. The pin 214 engages in a slot in a lug 216 that projects from the arm 201. An indexing pointer 219 is secured to shaft 211. It has a pin 220 on it that is adapted to be engaged in any one of a series of three spaced holes 222 (Fig. 1) in the plate 223, which is fastened to the front of the housing. The holes 222 correspond, respectively, to the three cams 185. The hinge 203—207 permits of this adjustment of the follower 200 up or down. A coil spring 217, that is interposed between the arm 213 and the guide 212 serves to urge the arm 213 rearwardly constantly toward the position shown in Fig. 5. Thus pin 220 is held in the hole 222 with which it is engaged and follower 200 is locked in engagement with a cam 185.

By pulling the knob 210 forwardly against the resistance of the spring 217, the arm 213 can be engaged with the lug 216 to disengage the follower 200 from the cam 185, with which it has been engaged, and pin 220 can be disengaged from the hole 222 with which it has been engaged. Then by rotating the knob 210, the arm 201 can be moved up or down to engage the follower 200 with another one of the cams 185.

It will be seen, then, that as the tracks 138 are shifted by rotation of knob 140 (Fig. 4) the cams 185 will be rotated through operation of tape 155, drum 170, and bevel gears 175 and 180, and that, as the cam 185, with which follower 200 is engaged, is thus rotated, arm 201 will be rocked, to swing mirror 57. Through this means the objective lens of the camera is adjusted until the two images of the subject received through the glasses 47 and 48 of the range finder are superimposed.

One of the features of the present invention is that simultaneously with adjustment of the ranger finder, correction of the view finder is made for parallax. To this end there is an arm 230 (Figs. 5 and 6) riveted to the arm 201. Pivotally mounted upon a lug 232 (Figs. 17 and 18) which projects upwardly from the floating base 76 is a parallax arm 234. This arm is hinged on a pivot stud 235 that is threaded into lug 232. The parallax arm 234 has a pin 236 projecting laterally from it which engages in an elongated slot 237 formed in the arm 230. The parallax arm is bent at right angles at its rear end to provide an arcuate frame plate 238 that has a rectangular frame slot 240 (Fig. 7) in it which registers with the sight opening 37 in the cover or housing 31. A counter-weight 241, which is secured to the front end of arm 234, tends to keep the parallax arm in horizontal position.

Figure 13:
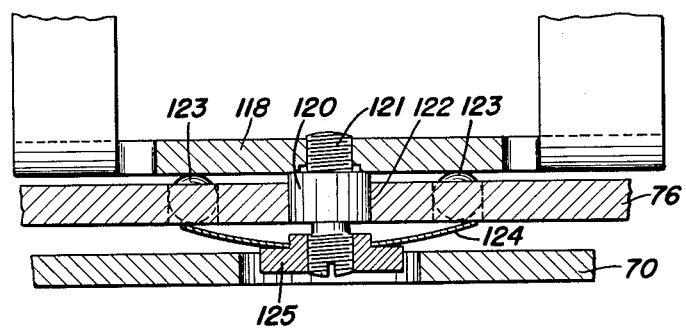
Fig. 13 is a section on the line 13—13 of Fig. 12, looking in the direction of the arrows.

As any one of the cams 181 is rotated, however, in focusing the camera, it will be seen that the arm 201 will be rocked about the axis of pivot stud 120 (Fig. 13), and that this will cause the slot 237 to rock the parallax arm 234 through engagement of the slot 237 with the pin 236. Thus the parallax frame 238 will be shifted and parallax correction will be made automatically as the objective lens of the camera is shifted, and simultaneously with the focusing of the camera under control of the range finder. It will be seen, also, that when the follower 200 is shifted from one cam 185 to another, the pin 236 will be relatively shifted simultaneously in the slot 237 so that the rotation of the new cam will differently affect the movement of the arm 234, thus imparting the proper correction in parallax in correspondence to the objective lens being used in the camera.

For night work or for work where the light is not sufficient for ordinary focusing, a "spot" focus is provided. The "spot" focus is housed in a casing 250 (Figs. 1, 2, 3 and 5) which is removably secured at one side of the cover or housing 31. The housing 31 has a guide block 257 secured to one side of it by screws 258. This block is formed with parallel guide ways 256 into or out of which the integral foot portion of 249 of casing 250 can be slipped.

Mounted within the casing 250 is an electric light bulb 251 of the type conventionally employed for spot focusing; and secured at the front of the casing 250 is a mirror 252. Secured at the front and one side of the casing is a lens 254. A generally L-shaped passageway is provided in the casing between bulb 251, mirror 252, and lens 254. A circular hole 265 is provided in block 257 in alignment with lens 254. A circular opening 266 is provided in the adjacent wall of cover 31 into which a plane glass 259 is fitted. An opening 267 in the wall of cover 31 permits light to be transmitted from glass 259 to the semi-transparent mirror 57.

The openings 265 and 266 may be shut off from one another by a dark slide 255. This dark slide is slidable in an opening between the block 257 and the side of cover or housing 31. It has a right angle bent portion 263 at its rear end that serves as a handle for moving it. When the slide is pulled rearwardly as far as it can go, that is, to the point where the pin 260, which is secured in the side of cover 31, bottoms in the right hand end of the slot 261 of the slide, as viewed in Fig. 16, the arcuate portion 268 in the front end of the slide registers with the openings 265 and 266, and permits light to pass from the casing 250 into housing 31. A leaf spring 264 having a shoe 269 attached thereto applies tension to the slide and serves to hold the slide in any adjusted position.

The light 251 may be connected to a battery or to any other suitable source of illumination. Two terminals 270 are provided in the casing 250 for this purpose.

Light passing from the bulb 251, when the slide 255 is open, is reflected by the mirror 252 through the lens 254, and glass 259. Part of this light passes through the mirror 57 to the prism 55 whence it is directed through the glass 48. Part of this light is reflected by the mirror 57 and directed through the glass 47. When the spot focus is in use, then, two images of the filament of the light bulb 251 are directed outwardly through the glasses 47 and 48, respectively. By pointing the camera at the object which it is desired to photograph, and adjusting the objective lens of the camera by means of the focusing knob 140, then, until the two images of the filament are superimposed upon one another, the camera can be focused. The light beam from the bulb 251 passes along the line 271 to the mirror 252 being reflected by that mirror through the lens 254 and glass 259 to the semi-transparent mirror 57.

A cover plate 275, which may be secured to the housing 215 in any suitable manner, serves to protect the mirror 252.

From the preceding description it will be seen that with the two sight openings 65 and 66 for view finder and range finder, respectively, in juxtaposition the photographer can shift his eye from one to the other quickly without disturbing the camera. Moreover, the focusing is under direct control of the range finder so that as the objective lens of the camera is shifted by the focusing knob 140 (Fig. 4), the mirror 57 (Fig. 5 is shifted through operation of tape 155, drum 170, gears 175 and 180, a cam 185, follower 200, and arm 201, thereby permitting the photographer, in lining up the two images of the subject in his range finder, to focus the camera accurately. Furthermore, it will be seen that in the focusing operation, correction is made for parallax through arm 230, pin 236 (Figs. 5, 6 and 7), arm 234, and parallax frame 238 so that the view finder gives the correct view of the subject at all times. In addition, through the provision of separate cams 185 for the different lenses, with which the camera may be supplied, both the range finder and the view finder can operate accurately regardless of what lens is used. Still further, a focus finder for night use is provided that in use cooperates with the range finder to permit proper finding of the range and view at night.

While the invention has been described in connection wtih a specific embodiment thereof, it will be understood that it is capable of further modification, and that this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The combination with a photographic camera having an objective lens mount that is adjustable for focusing, of a view-finder, a rangefinder comprising a pair of reflectors which are arranged in optical relationship with one another, a plurality of rotary cams mounted in axially-spaced relation for rotation about a common axis, said cams having different active shapes for use, respectively, with objective lenses of different focal lengths that may be employed on said camera, means for coupling said cams to said lens mount to rotate said cams on their axis on focusing adjustment of said lens mount, an arm mounted for pivotal movement about an axis parallel to the axis of said cams, and a follower secured to said arm and adapted to be engaged selectively with one of said cams to cause said arm to pivot bout its axis on rotation of said cams, one of said reflectors being mounted on said arm to pivot with said arm about the pivotal axis of said arm, said arm having two parts which are hingedly connected together, said one reflector being secured to one of said two parts at one side of the hinged connection between said parts and said follower being secured to the other of said two parts at the other side of said hinged connection whereby the latter part may be hinged on the first-named part to shift said follower from engagement with one of said cams to engagement with another cam without disturbing the position of said one reflector, a movable sighting frame positioned in front of said viewfinder in operative relation thereto for framing the field of view, and means connecting said latter part of said arm to said sighting frame to shift the position of said sighting frame relative to said viewfinder on shift of said follower from one cam to another.

2. The combination with a photographic camera having an objective lens mount that is adjustable for focusing, of a viewfinder, a rangefinder comprising a pair of reflectors which are arranged in optical relationship with one another, a plurality of rotary cams mounted in axially-spaced relation for rotation about a common axis, said cams having different active shapes for use, respectively, with objective lenses of different focal lengths that may be employed on said camera, means for coupling said cams to said lens mount to rotate said cams on their axis on focusing adjustment of said lens mount, an arm mounted for pivotal movement about an axis parallel to the axis of said cams, and a follower secured to said arm and adapted to be engaged selectively with one of said cams to cause said arm to pivot about its axis on rotation of said cams, one of said reflectors being mounted on said arm to pivot with said arm about the pivotal axis of said arm, said arm having two parts which are hingedly connected together, said one reflector being secured to one of said two parts at one side of the hinged connection between said parts and said follower being secured to the other of said two parts at the other side of said hinged connection whereby the latter part may be hinged on the first-named part to shift said follower from engagement with one of said cams to engagement with another cam without disturbing the position of said one reflector, a sighting frame positioned in front of said viewfinder in operative relation thereto and mounted for pivotal movement about an axis lying in a plane perpendicular to the axes of said cams and of said arm, and means connecting said latter part of said arm to said sighting frame to pivot said sighting frame about its axis on shift of said follower from one cam to another thereby to shift the field of view to compensate for the parallax between the different objective lenses.

3. The combination with a photographic camera having an objective lens mount that is adjustable for focusing, of a viewfinder, a rangefinder comprising a pair of reflectors which are arranged in optical relationship with one another, a plurality of rotary cams mounted in axially-spaced relation for rotation about a common axis, said cams having different active shapes for use, respectively, with objective lenses of different focal lengths that may be employed on said camera, means for coupling said cams to said lens mount to rotate said cams on their axis on focusing adjustment of said lens mount, an arm mounted for pivotal movement about an axis parallel to the axis of said cams, and a follower secured to said arm and adapted to be engaged selectively with one of said cams to cause said arm to pivot about its axis on rotation of said cams, one of said reflectors being mounted on said arm to pivot with said arm about the pivotal axis of said arm, said arm having two parts which are hingedly connected together, said one reflector being secured to one of said two parts at one side of the hinged connection between said parts and said follower being secured to the other of said two parts at the other side of said hinged connection whereby the latter part may be hinged on the first-named part to shift said follower from engagement with one of said cams to engagement with another cam without disturbing the position of said one reflector, a movable sighting frame positioned in front of said viewfinder in operative relation thereto for framing the field of view, and means connecting said latter part of said arm to said sighting frame to move said sighting frame both on pivotal movement of said arm and on hinged movement of said latter part of said arm, whereby to compensate by shift of the field of view for the difference in parallax of the different objective lenses and for change in parallax during focusing of each objective lens.

4. The combination with a photographic camera having an objective lens mount that is adjustable for focusing, of a view-finder, a rangefinder comprising a pair of reflectors which are arranged in optical relationship with one another, a plurality of rotary cams mounted in axially-spaced relation for rotation about a common axis, said cams having different active shapes for use, respectively, with objective lenses of different focal lengths that may be employed on said camera, means for coupling said cams to said lens mount to rotate said cams on their axis on focusing adjustment of said lens mount, an arm mounted for pivotal movement about an axis parallel to the axis of said cams, and a follower secured to said arm and adapted to be engaged selectively with one of said cams to cause said arms to pivot about its axis on rotation of said cams, one of said reflectors being mounted on said arm to pivot with said arm about the pivotal axis of said arm, said arm having two parts which are hingedly connected together, said one reflector being secured to one of said two parts at one side of the hinged connection between said parts and said follower being secured to the other of said two parts at the other side of said hinged connection whereby the latter part may be hinged on the first-named part to shift said follower from engagement with one of said cams to engagement with another cam without disturbing the position of said one reflector, a sighting frame positioned in front of said viewfinder in operative relation thereto and mounted for pivotal movement about an axis lying in a plane perpendicular to the axes of said cams and of said arm, and means connecting said latter part of said arm to said sighting frame to effect pivotal movement of said sighting frame both on pivotal movement of said arm and of hinged movement of said latter part of said arm, whereby to compensate by shift of the field of view for the difference in parallax of the different objective lenses and for change in parallax during focusing of each objective lens.

5. The combination with a photographic camera having an objective lens mount that is adjustable for focusing, of a viewfinder, a rangefinder comprising a pair of reflectors which are arranged in optical relationship with one another, a plurality of rotary cams mounted in axially-spaced relation for rotation about a common axis, said cams having different active shapes for use, respectively, with objective lenses of different focal lengths that may be employed on said camera, means for coupling said cams to said lens mount to rotate said cams on their axis on focusing adjustment of said lens mount, an arm mounted for pivotal movement about an axis parallel to the axis of said cams, and a follower secured to said arm and adapted to be engaged selectively with one of said cams to cause said arm to pivot about its axis on rotation of said cams, one of said reflectors being mounted on said arm to pivot with said arm about the pivotal axis of said arm, said arm having two parts which are hingedly connected together, said one reflector being secured to one of said two parts at one side of the hinged connection between said parts and said follower being secured to the other of said two parts at the other side of said hinged connection whereby the latter part may be hinged on the first-named part to shift said follower from engagement with one of said cams to engagement with another cam without disturbing the position of said one reflector, a sighting frame positioned in front of said viewfinder in operative relation thereto and mounted for pivotal movement about an axis lying in a plane perpendicular to the axes of said cams and of said arm, and means connecting said latter part of said arm to said sighting frame to effect pivotal movement of said sighting frame both on pivotal movement of said arm and of hinged movement of said latter part of said arm, comprising a second arm projecting laterally from said latter part of the first-named arm, and having a pin and slot connection with said sighting frame.

References Cited in the file of this patent

UNITED STATES PATENTS

| | | |
|---|---|---|
| 1,819,844 | Ross | Aug. 18, 1931 |
| 1,964,883 | Kuppenbender et al. | July 3, 1934 |
| 1,967,279 | Barnack | July 24, 1934 |
| 2,041,632 | Barnack | May 19, 1936 |
| 2,123,494 | Barnack | July 12, 1938 |
| 2,135,988 | Nagel | Nov. 8, 1938 |
| 2,157,547 | Leitz | May 9, 1939 |

(Other references on following page)

UNITED STATES PATENTS

| | | |
|---|---|---|
| 2,172,339 | Mihalyi | Sept. 5, 1939 |
| 2,215,370 | Hineline | Sept. 17, 1940 |
| 2,267,811 | Brownscombe | Dec. 30, 1941 |
| 2,293,438 | Liehmann et al. | Aug. 18, 1942 |
| 2,312,261 | Mills | Feb. 23, 1943 |
| 2,336,330 | Wittel | Dec. 7, 1943 |
| 2,386,614 | Kaprelian | Oct. 9, 1945 |
| 2,397,160 | Schwartz et al. | Mar. 26, 1946 |
| 2,403,308 | Schwartz et al. | July 2, 1946 |
| 2,413,017 | Willcox | Dec. 24, 1946 |
| 2,461,499 | McCathron | Feb. 8, 1949 |
| 2,481,656 | Gillon et al. | Sept. 13, 1949 |
| 2,482,628 | Little | Sept. 20, 1949 |
| 2,505,983 | Mills | May 2, 1950 |

FOREIGN PATENTS

| | | |
|---|---|---|
| 543,554 | France | June 7, 1922 |
| 398,045 | Germany | July 10, 1924 |
| 409,179 | Great Britain | Apr. 26, 1934 |
| 629,024 | Germany | Apr. 21, 1936 |
| 816,032 | France | Apr. 19, 1937 |
| 653,860 | Germany | Dec. 4, 1937 |
| 694,128 | Germany | July 25, 1940 |
| 237,011 | Switzerland | July 16, 1945 |

OTHER REFERENCES

Strong, Procedures in Experimental Physics, published by Prentice-Hall, Inc., New York, 1946, pages 585 and 586.